(12) United States Patent
Thiel et al.

(10) Patent No.: US 7,293,829 B2
(45) Date of Patent: Nov. 13, 2007

(54) HEADREST FOR MOTOR VEHICLE (75) Inventors: Thomas Thiel, Solingen (DE); Rolf Steinmetz, Düsseldorf (DE); Burkhard Becker, Solingen (DE)

(73) Assignee: Medical Instill Technologies, Inc., New Milford, CT (US)

( * ) Notice: Subject to any disclaimer, the term of this patent is extended or adjusted under 35 U.S.C. 154(b) by 0 days.

(21) Appl. No.: 11/324,912

(22) Filed: Jan. 4, 2006

(65) Prior Publication Data

US 2006/0163919 A1 Jul. 27, 2006

(30) Foreign Application Priority Data

Jan. 4, 2005 (DE) .................... 10 2005 000 756

(51) Int. Cl.
*B60N 2/42* (2006.01)
(52) U.S. Cl. ................................. 297/216.12
(58) Field of Classification Search .......... 297/216.12, 297/216.1, 404, 408
See application file for complete search history.

(56) References Cited

U.S. PATENT DOCUMENTS

| 6,082,817 | A | * | 7/2000 | Muller | .................. | 297/216.12 |
| 6,688,697 | B2 | * | 2/2004 | Baumann et al. | ........... | 297/391 |
| 6,715,829 | B2 | * | 4/2004 | Svantesson et al. | ... | 297/216.12 |
| 6,957,858 | B2 | * | 10/2005 | Yetukuri et al. | ....... | 297/216.12 |
| 7,108,320 | B2 | * | 9/2006 | Schafer et al. | ......... | 297/216.12 |

FOREIGN PATENT DOCUMENTS

DE 102 15 054 A 1 10/2003

* cited by examiner

*Primary Examiner*—Milton Nelson, Jr.
(74) *Attorney, Agent, or Firm*—McCarter & English, LLP (57) ABSTRACT The headrest has a first structural component for fastening the headrest to a seat back of a motor vehicle seat and a second structural component that is movable with respect to said first structural component in the event of a crash. A drive unit is disposed between the first structural component and the second structural component and comprises a locking unit, which is locked in the normal case, and a crash sensor connected to the locking unit which it controls. The locking unit comprises a disengagement drive with an electromagnet or a piezoelectric drive. The locking unit has one retainer member associated with the first structural component and one movable disengagement member associated with the second structural component. Retainer member and disengagement member are connected together via a hinge or via balls. The disengagement drive is capable of causing said disengagement member to move.

18 Claims, 7 Drawing Sheets

HEADREST FOR MOTOR VEHICLE

CROSS-REFERENCE TO RELATED APPLICATIONS

This application claims priority to German Application No. DE 10 2005 000 756.2, filed Jan. 4, 2005, the contents of which are hereby expressly incorporated by reference in their entirety as part of the present disclosure.

BACKGROUND

The invention relates to a headrest for a motor vehicle having the features of the preamble of claim 1.

A such type headrest is known from DE 102 15 054 A1. The first structural component is intended to be secured to a seat back of a motor vehicle seat, said first structural component including at least one bar. The second structural component comprises a bolster and if necessary further structural elements. In the normal state, the second structural component and as a result thereof the bolster as well, are in a normal position. In the event of a crash, the second structural component moves forward and, as a result thereof, gets in closer proximity to a passenger's head. This arrangement prevents what is termed a neck sprain/strain or whip lash in rear impact collisions. In the crash state, the second structural component is displaced some centimeters to the front and as far as practicable toward the top as well with respect to the normal state.

The drive unit is disposed between the first and the second structural component. It comprises a drive, for example a pressure storing means such as a spring. Said drive biases the second structural component with respect to the first structural component, e.g., elastically. In the normal case, the drive is locked by the locking unit only to be released by said locking unit when a crash occurs. Said crash event is sensed by a crash sensor. A current crash sensor provided anyway for enabling the air bags may be used for this purpose as well. Or a separate crash sensor may be provided. It is responsive to the threshold at which the air bags are usually also enabled.

The locking unit has to be capable of releasing the drive as quickly as possible so that the second structural component can be moved as fast as possible from the normal position to the forwardly moved position upon sensing a crash. The locking unit is responsive to electrical activation, it receives an electrical signal from the crash sensor and becomes actuated when this signal occurs.

On the headrest according to the document DE 102 15 054 A1 mentioned herein above, the locking unit comprises a magnetic clamp, meaning the locking unit is configured to have magnetic holding force. The magnetic holding force is preferably applied by a permanent magnet. There is provided a coil that generates an opposing magnetic field when the current flows through it in the event of a crash. This opposing field weakens the force of the permanent magnet to such an extent that the locking unit disengages and the second structural component is allowed to move with respect to the first structural component.

For practical operation however, such a magnetic clamp is not safe enough. It relies for operation on frictional adherence. If its holding force is reduced by an annoyance such as acceleration or what is called misuse or vandalism, and if the extent of this reduction corresponds to the reduction effected by the current-carrying coil, the headrest is enabled. This however is useless, untimely and incommodes the passengers.

Another disadvantage of the prior art magnetic clamp is that the cooperating surfaces have to very accurately match. Dirt also has to be prevented from soiling the adhering surfaces. If possible, any gap between said adhering surfaces should be avoided.

SUMMARY OF THE INVENTION

It is the object of the invention to develop the prior art headrest so as to provide one that is more functionally reliable and less prone to failure. It is therefore the object of the invention to develop the prior art headrest in such a manner that the locking unit is less prone to failure and relies for operation not only on frictional adherence but preferably on interlocking adherence and is capable of absorbing higher locking forces.

This object is solved by the headrest having the features of claim 1. On this headrest, the locking unit has either an electromagnet or a piezoelectric drive. Said piezoelectric drive is connected to the crash sensor, it is at least activated by the crash sensor. The electromagnet or the piezoelectric drive provides the necessary stroke for the movable disengagement member to be mechanically moved with respect to the retainer member in such a manner that a mechanical limit stop is overcome. By this arrangement, larger forces as they exist in the form of locking forces between the two structural components and are effected by the drive of the driving unit can finally be controlled with quite small driving forces provided by the electromagnet or the piezoelectric drive. The releasing forces may be kept all the more small if the moving members are in mutual contact through rollers and rolling elements. Therefore, the invention aims at avoiding any sliding friction between the disengagement member and the retainer member and at providing a construction such that the only friction that occurs is a rolling friction. Therefore, the retainer member and the disengagement member are contacting each other through rolling elements only, more specifically through balls only, at least in the normal case.

As contrasted with the prior art headrest, this catch device is capable of absorbing higher locking forces and remains engaged even at high accelerations at which the prior art locking device no longer holds.

It has been found very advantageous to have the locking unit releasing in a direction that is transverse to the direction in which the motor vehicle travels on a straight path. By this arrangement, the locking unit is not influenced by acceleration as it occurs in the event of a rear impact collision. Another possibility is to intentionally make use of the accident acceleration for releasing the stopper unit.

Preferably, the locking unit is actuated upon rotation and/or in the y direction. By this arrangement, the locking unit is prevented from being subjected to heavy load in the event of strong vertical accelerations such as when the vehicle drives over a step or a bump. Preferably, the release motion applied by the electromagnet or the piezoelectric drive also occurs in a direction transverse to the direction in which the second structural component moves away from the first structural component.

In a first embodiment, the disengagement member has a circumferential groove mating the balls. In the normal case, the balls engage the groove. The retainer member surrounds the balls and has an inner contour the balls fit against. The inner contour further has bight portions extending outward and providing space for the balls. Upon rotation of the inner contour, the balls clear the way by entering said bight portions. As a result, they come free from the groove and the disengagement member can be moved with respect to the retainer member. The retainer member is thereby caused to rotate by the electromagnet or the piezoelectric drive. The electromagnet or the piezoelectric drive may hereby directly drive and, as a result thereof, rotate the disengagement member, but it is also possible to bias the disengagement member by a pressure storing means such as a torsion spring and to provide a nose against which the electromagnet or the piezoelectric drive abut in the normal case. A small movement away from the nose then suffices to release the torsion spring which in turn causes the retainer member to rotate thus allowing the connection between the retainer member and the disengagement member to come free.

In another embodiment, retainer member and disengagement member are a lever arm each which together form a knee lever arrangement. In the normal case, the two members are extended so that the ends they do not have in common are spaced the greatest possible distance. In the event of a crash, the lever arrangement folds up and shortens as a result thereof. A reverse sequence of movements is also possible.

For releasing the pair of knee levers, it merely has to be deviated from the initial position until self-locking is no longer provided. Here, the two lever arms usually merely need to be brought into a position that is short of the 180° position by about 7°. All the other movements of the pair of levers need no longer be executed by the electromagnet or the piezoelectric drive; the drive of the locking unit performs this task instead.

Friction can be considerably reduced by having the levers carried on balls, more specifically by having all the hinges carried on balls, so that the pair of levers can be actuated with little force by the piezoelectric drive or the electromagnet, that is to say that it is possible to control large locking forces.

BRIEF DESCRIPTION OF THE DRAWINGS

Other benefits and advantages will become more apparent upon reviewing the appended claims and the following non restrictive description of embodiments of the invention, given by way of example only with reference to the drawing. It should be understood that these exemplary embodiments are not limiting. In said drawing:

DETAILED DESCRIPTION

Figure 1:
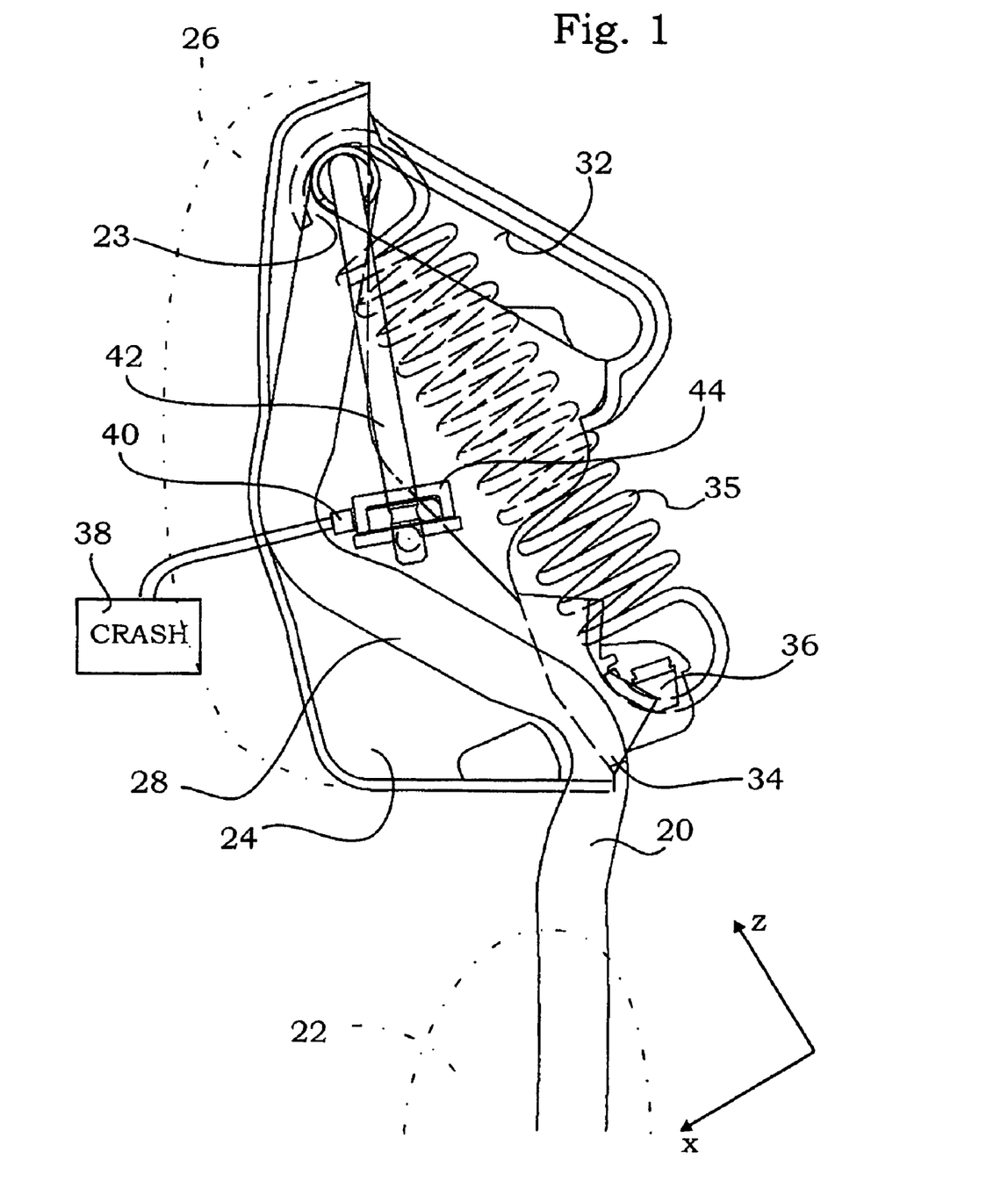
FIG. 1 is a schematic side view of a headrest of a vehicle seat the top region of the seat back of which is illustrated with the headrest being in the normal position.

The headrest has two bars 20 that are retained in a seat back 22. In their uppermost region, the bars 20 are joined by a crossbar 23 to form a generally U-shaped one-piece member. Said U-shaped one-piece member belongs to a first structural component. The U-shaped member carries a supporting body 24 which, in the exemplary embodiments, is substantially made from a plastic part. This supporting body 24 will be discussed in further detail herein after. Finally, the headrest typically has a padding 26 which is illustrated in FIG. 1 and is carried by the supporting body. Supporting body 24 and padding 26 belong to a second structural component that is movable with respect to the first structural component. The movement becomes apparent when comparing e.g., the FIGS. 1 and 2.

The bars 20 have an inclined portion 28. In this portion, they deviate from the normal direction in which they protrude from the seat back 22 and which is oriented substantially in the z direction so as to be slightly inclined forward. By this arrangement, the inclined portions are at an acute angle to the y axis. Above these inclined portions 28, the bars 20 again substantially extend toward crossbar 23, resuming their initial orientation. The inclined portion 28 preferably is at an angle of 5 to 50° to the x axis and lies in the x-z plane. It is between 5 and 15 cm long. The inclined portion 28 is always located above the seat back 22.

The supporting body 24 has one guide portion 34 for each bar 20, said guide portion 34 being located in the inclined portion 28 around which it forms an at least partially surrounding grip, said guide portion being at least guided on this inclined portion 28. In the normal position of utilization or normal position as shown in FIG. 1, the guide portions 34 are located in the lowermost part of a respective one of the inclined portions 28; in parts, they are located in the region of the lower bend there. The guide portions 34 are configured so as to be capable of readily gliding over the inclined portion 28, starting from the normal position shown in FIG. 1 into the crash or accident position of the headrest shown in FIG. 2.

Figure 2:
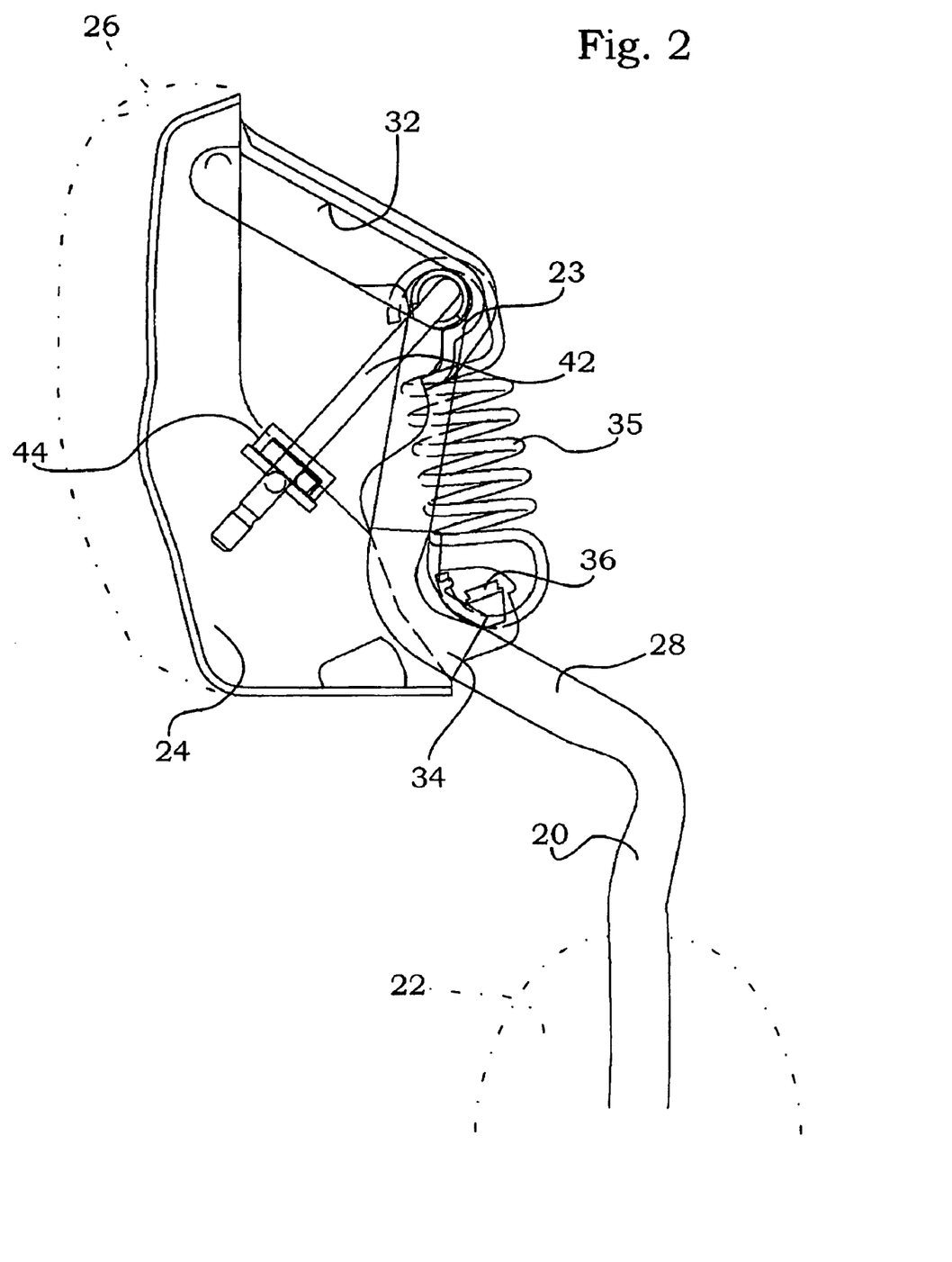
FIG. 2 is an illustration like FIG. 1, but now with the headrest being in the crash position.

At the top, the supporting body 24 has two elongate guide tracks 32, each receiving the crossbar 23. The supporting body runs along the entire length of these guide tracks when the headrest passes from the normal position (FIG. 1) to the crash position as shown in FIG. 2. The at least one guide track 32 guides the supporting body 24 together with the inclined portions 28.

The headrest is caused to move from the position in FIG. 1 to the state shown in FIG. 2 by a drive unit that will be discussed as follows: The drive unit comprises a helical spring 35 which here forms a pressure storing means. This helical spring 35 is responsive to tension; its length shortens as it passes from the normal position according to FIG. 1 to the crash position shown in FIG. 2. On the one side, the helical spring 35 acts at the top onto the center of the crossbar 23, on the other side it is fixed at the bottom in an abutment 36 formed by the supporting body 26. The drive unit further includes a crash sensor 38 that is schematically illustrated in FIG. 1. A current crash sensor like those used for enabling airbags may be used here. The electrical signal it delivers is sufficiently high; this will be discussed herein after.

Finally, the drive unit has a locking unit, which is also called a retainer unit. Its function is to stop the drive, which is here realized by the helical spring 35, until the crash sensor 38 delivers a signal. Upon reception of the signal, the locking unit passes from the normal position to the release position, the normal position is e.g., illustrated in the FIGS. 1, 4 and 9, the release position, in the FIGS. 2, 5 and 10. The invention proposes various locking units; the locking units in the first exemplary embodiment according to the FIGS. 1 through 6 will be discussed first.

In this exemplary embodiment, the locking unit comprises a disengagement drive 39 in the form of a piezoelectric drive 40. What is termed an Elliptec motor sold by Elliptec Resonant Aktuator AG is used, the reader being referred in this context to the documents WO 03/090338 A2 and WO 03/090339 A2. The principle therebehind is that a vibrating piezoelectric crystal gradually drives a driver member by pushing it forward for example. Many individual movements of the crystal add together to form quite long a drive path. The crash sensor 38 delivers a signal that is sufficient for the piezoelectric body.

Figure 3:
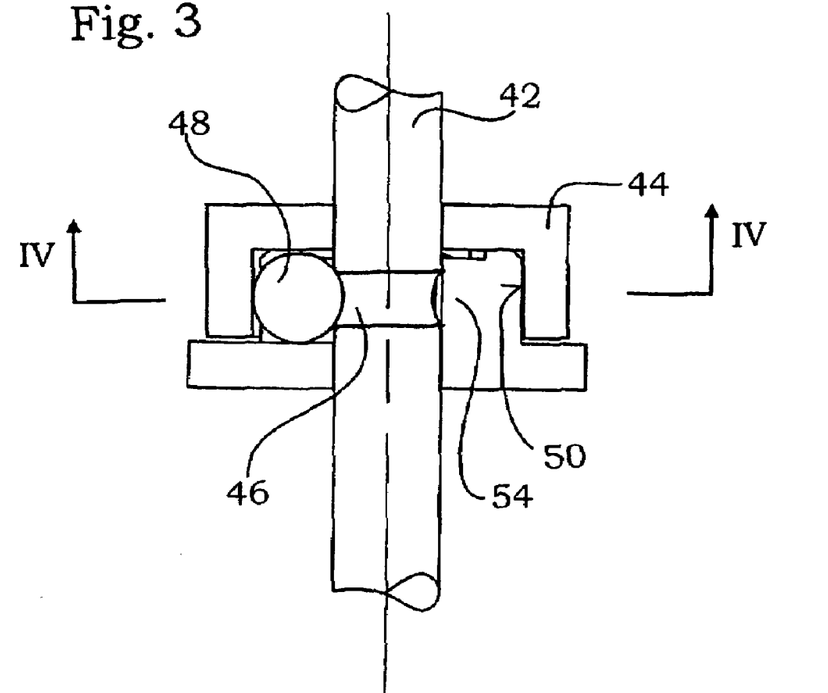
FIG. 3 is a sectional view in the axial direction through a locking unit as used in FIG. 1.
Figure 5:
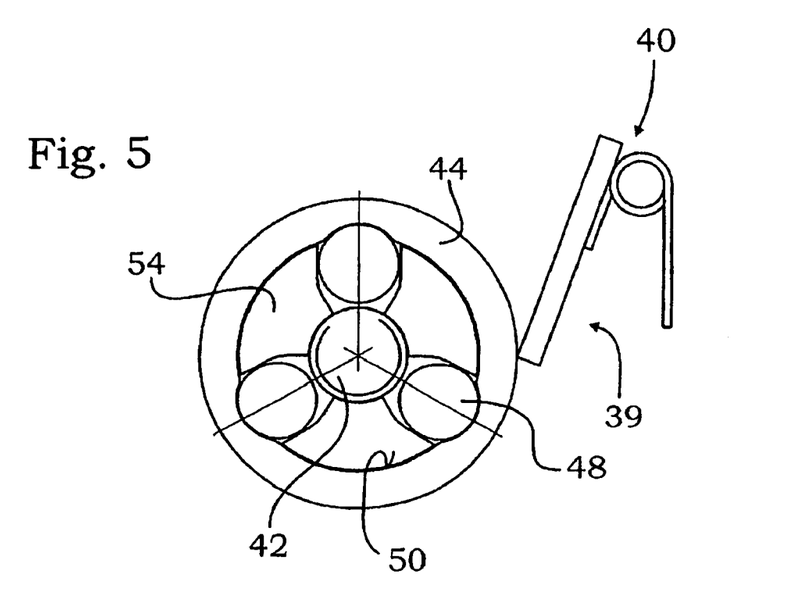
FIG. 5 is a sectional view according to FIG. 4, but now in the crash position.
Figure 6:
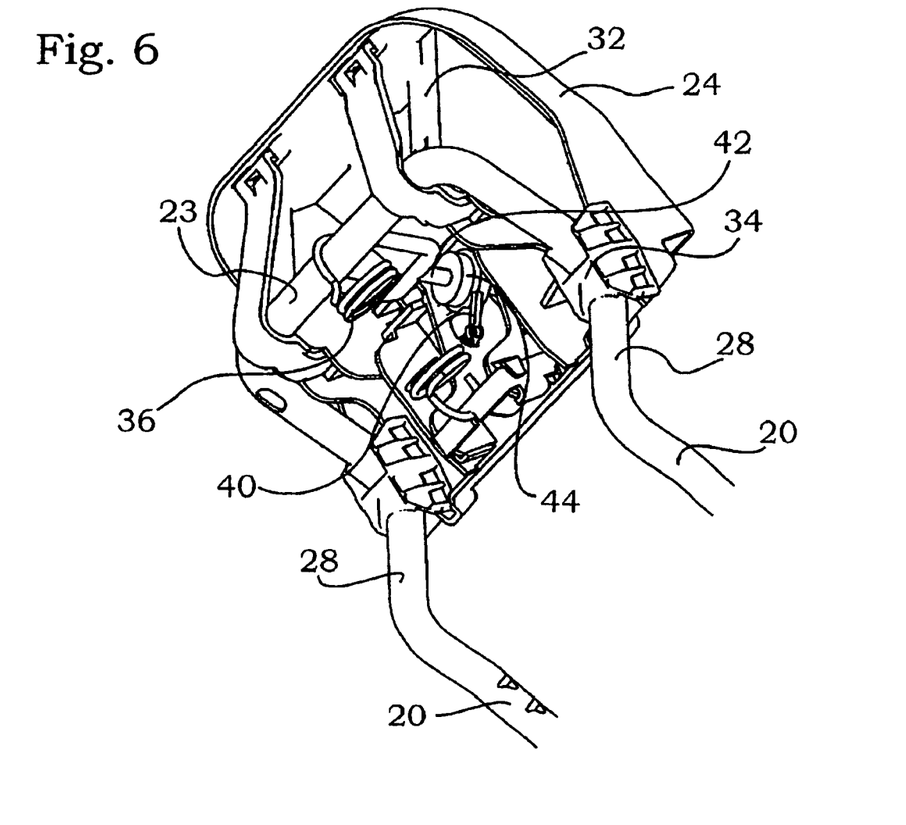
FIG. 6 is a perspective illustration viewed obliquely from below and behind of the state according to FIGS. 2 and 5, that is, with the headrest in the crash position.

The locking unit has a retainer member 42 and a movable disengagement member 44 with the disengagement member 44 being rotatable in the embodiment shown. In the exemplary embodiment shown, the retainer member 42 is configured to be a round rod with a forked upper end (see FIG. 6) that is hinged to the crossbar 23. In its lower part, it has a circumferential groove 46. Three balls 48 engage therein, see FIGS. 3 and 4, the groove 46 being configured accordingly. The disengagement member 44, which has a substantially cylindrical inner contour 50 but comprises outward-tapering bight portions 52 into which the balls 48 are allowed to enter at least far enough to come free from the groove 46, forms a surrounding grip around said balls. At first, the bight portions 52 have a flat incline and become ever deeper when viewed across the circumference; at their end they reach the deepest point. In the illustration shown in FIG. 5, the balls are located there. They only come free in one direction of rotation of the disengagement member.

Figure 4:
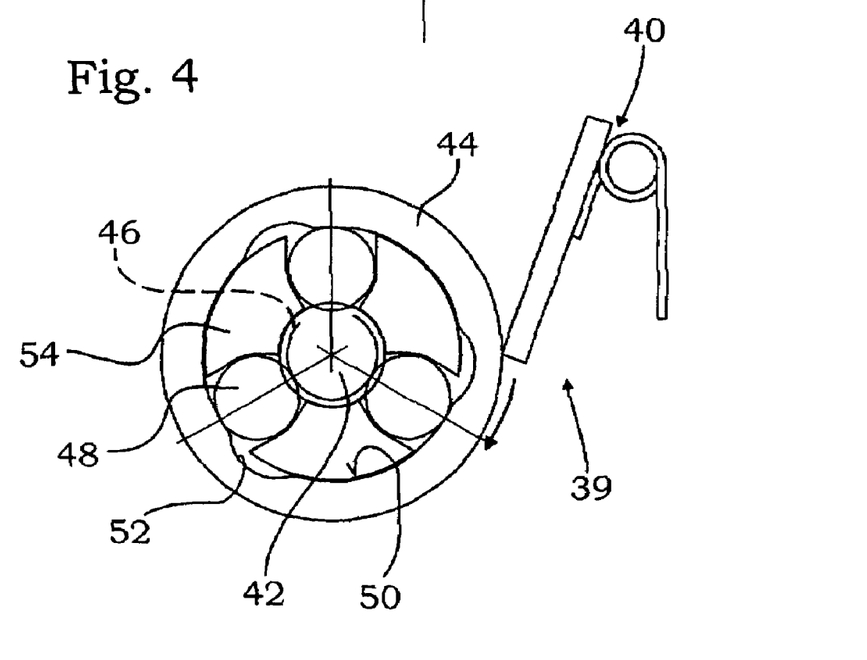
FIG. 4 is a section taken along section line IV-IV of FIG. 3 and additionally with a piezoelectric element; the normal position is shown.

In the normal position, the balls 48 are seated in the groove and are retained in this position by the disengagement member 44, see FIG. 4. The bight portions 52 are slightly offset with respect to the balls 48. Interlocking engagement is achieved. Clockwise rotation of the disengagement member 44 by a few degrees, for example by approximately 12°, causes the bight portions 52 to position themselves outside of the balls 48 so that the balls are now allowed to clear the way by entering these bight portions 52. They do this in response to the axial tension load to which the retainer member 42 is subjected. Between the two states according to FIG. 4 and FIG. 5, the disengagement member 44 is driven to rotate by the piezoelectric drive 40. The drive may use small forces because at the beginning at least the motion is purely a rolling one so that sliding friction hardly occurs. Preferably, the entire movement is a mere rolling motion, it is preferred that no sliding friction occur.

The disengagement member 44 is hingedly secured to the supporting body 26, a central rib being provided on the supporting body 24 for this purpose. Concretely, the disengagement member 44 of the first exemplary embodiment also has a guide member which comprises on the one side intermediate bodies 54 located between the balls 48 and on the other side a circular terminating plate located beneath said intermediate bodies 54.

Figure 7:
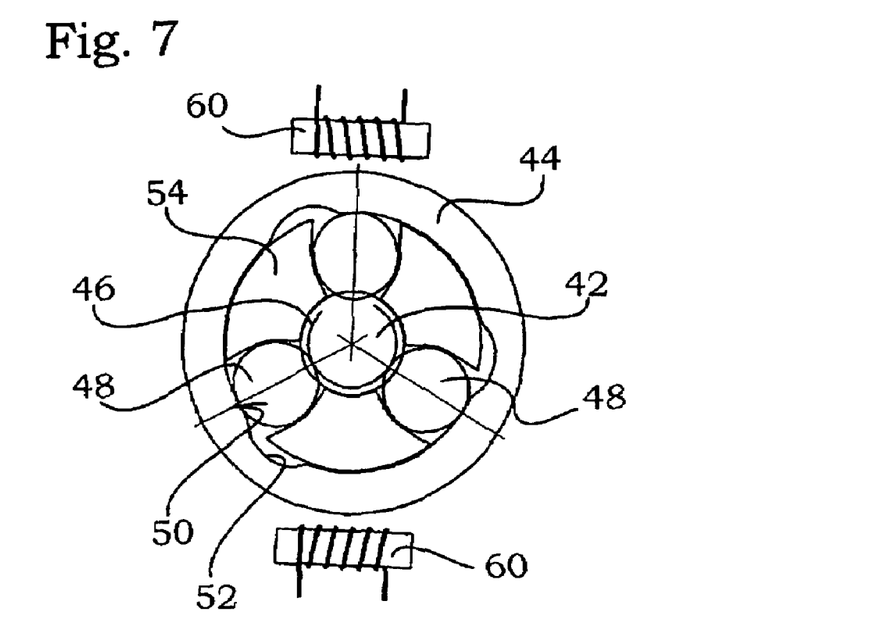
FIG. 7 is a sectional view according to FIG. 4, but now with the electromagnet as a drive.

In the second exemplary embodiment according to FIG. 7, the disengagement drive 39 is no longer realized by a piezoelectric drive 40 but by an electromagnetic drive in the form of an electromagnet 60 instead. Two electromagnets 60 are drawn in FIG. 7. The disengagement member 44 is permanently magnetic and can be driven for clockwise rotation when the coils of the two electromagnets 60 are carrying current. It is also possible, by varying the second exemplary embodiment according to FIG. 4, to provide an armature, meaning a movable part of an electromagnet 60, that mechanically acts against the disengagement member 44 to rotate the disengagement member as soon as the coil carries current.

Figure 8:
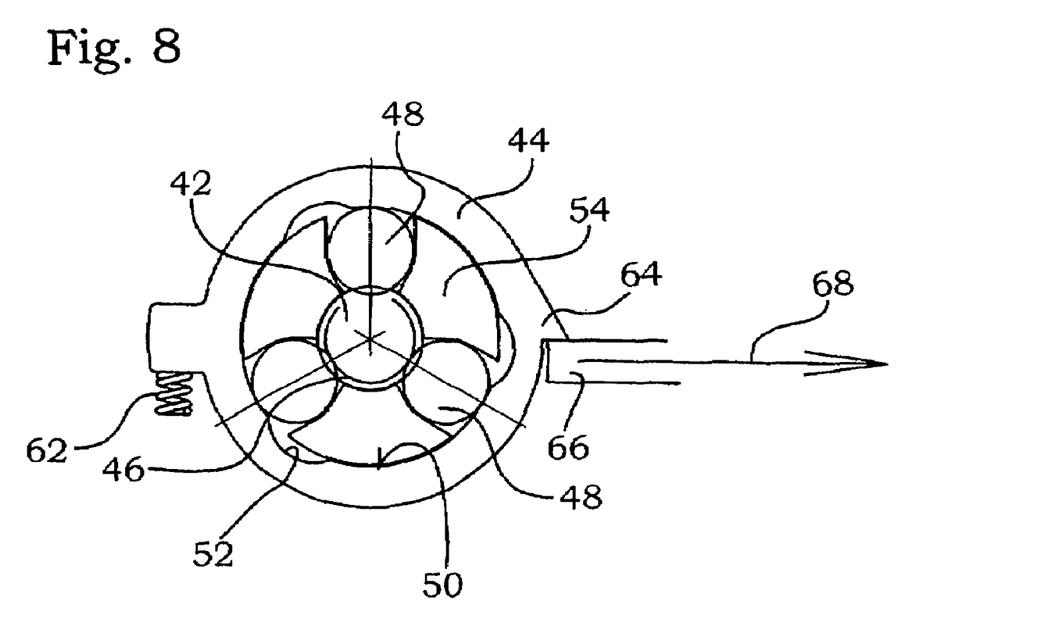
FIG. 8 is a sectional view similar to FIG. 4, but now with torsion spring, electromagnet and stop device.

In the third exemplary embodiment according to FIG. 8, the motion of rotation of the disengagement member 44 is effected by a torsion spring 62 which in this particular case is configured to be a pressure loaded helical spring and which abuts an abutment 36 (not shown) provided on the supporting body 26 and a projection of the retainer member 42. The retainer member 42 further has a nose 64 an armature 66 of an electromagnet 60 fits against. The torsion spring 62 urges the nose 64 against the armature 66. If the anchor is pulled away toward the right pursuant to arrow 68, the nose is free and the torsion spring 62 capable of completing the motion of rotation of the disengagement member 44. Again, the electromagnet effects the disengagement drive 39.

In the exemplary embodiments discussed hereto before, the locking unit may also be inverted to provide a reversal in kinematics, that is to say that the retainer member 42 can be hinged to the supporting body 26. It is also possible to have the retainer member 42 rotating and the disengagement member 44 remaining stationary. Three balls 48 are preferably utilized although a greater or a lesser number of balls may also be provided.

Figure 9:
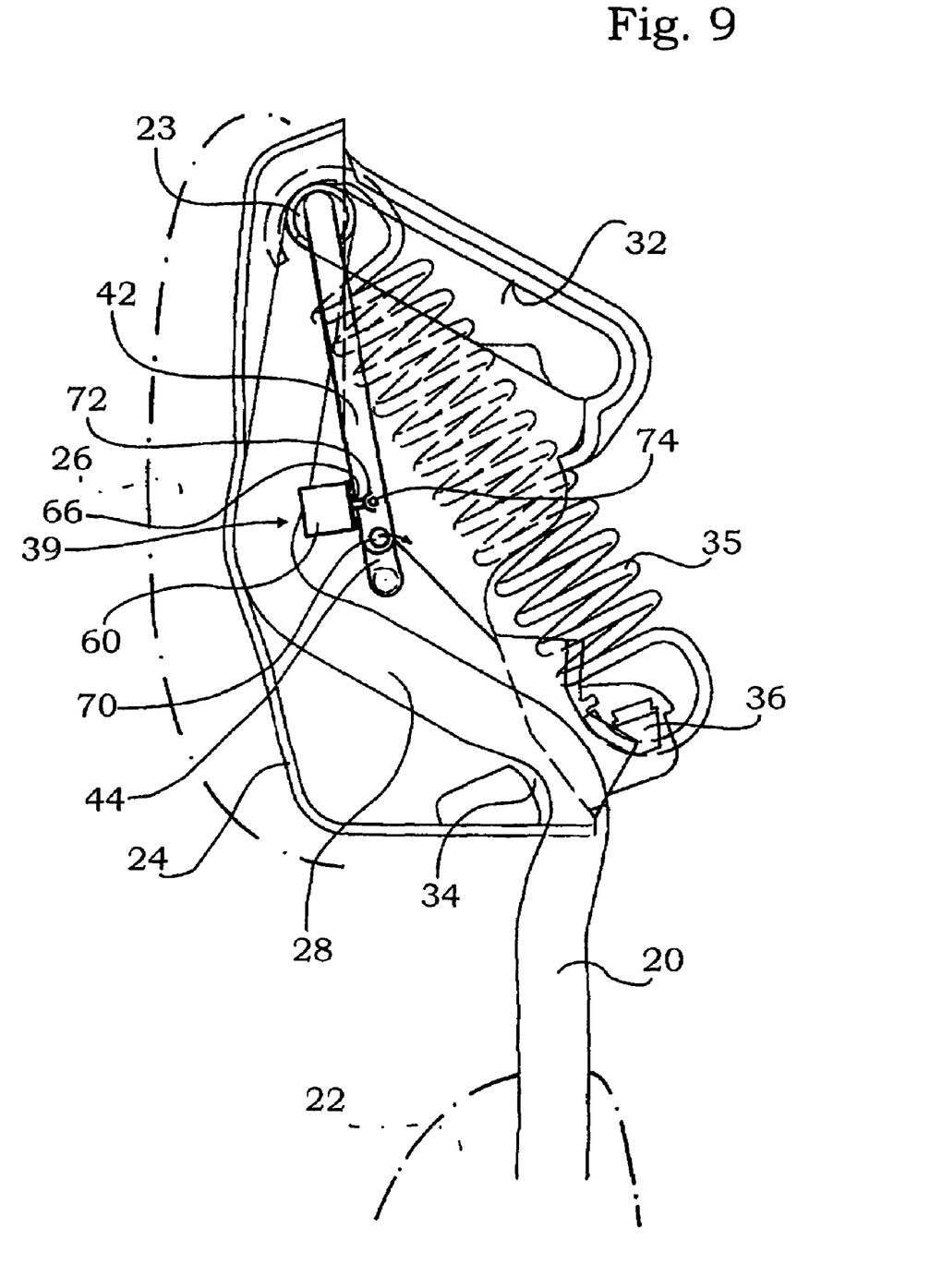
FIG. 9 is an illustration according to FIG. 1 but now with a bent lever arrangement and FIG. 10 is an illustration of the headrest according to FIG. 9 in the crash position.
Figure 10:
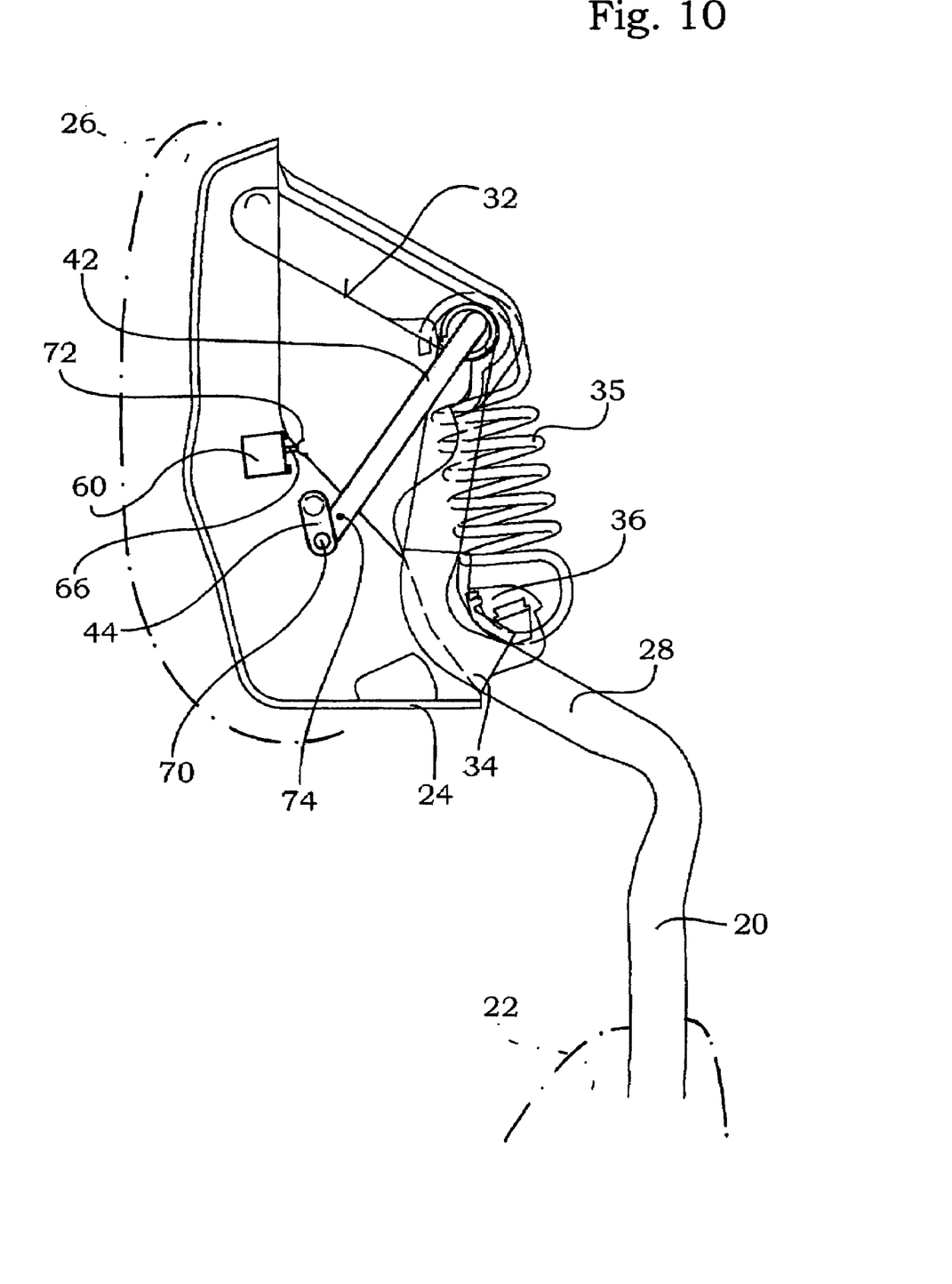

In the fourth exemplary embodiment according to the FIGS. 9 and 10, another locking unit is proposed. Now, the retainer member 42 is a lever arm that is hinged to the crossbar 23 at an upper hinge. The lower hinge is connected together with a disengagement member 44 also configured to be a lever arm; the common hinge is called a knee lever hinge 70. This disengagement member 44 is in turn hinged to the supporting body 26 like in the exemplary embodiments described herein above.

Slightly above the knee lever hinge 70, an armature of an electromagnet 60 is operative. It forms the disengagement drive 39. The armature 66 may also act onto other points of the two lever arms 42, 44; it may also act onto any extended portion, bight portion or additional part as long as it initiates the movement described herein after. The armature 66 has a dog 72 that is open toward the front. On the retainer arm 42 there is provided a pin 74 for cooperation with said dog 72; it does not fit against the dog but is separated therefrom by a gap. By this arrangement, the armature 66 can accumulate some kinematic energy before it strikes the pin 74 with impetus. In the normal position, the armature 66 may also fit on the dog 72.

In the normal position as shown in FIG. 9, the two lever arms, that is, the retainer member 42 and the disengagement member 44, are substantially in the 180° position. Accordingly, the knee lever hinge 70 is substantially located in the center of a line joining the two outer, non common hinge regions. Preferably, and as shown in FIG. 9, the knee lever hinge 70 is even slightly bent or offset toward the armature 66 so that the two members 42, 44 are disposed at an angle of for example 182° or more with respect to one another.

If the electromagnet 60 is excited in the state described in accordance with FIG. 9, its armature 66 pushes the knee lever hinge 70 toward the right in the FIG., meaning toward the helical spring 35. At need, this movement of the armature 66 is encouraged by the acceleration forces of the rear impact. As soon as the two members 42, 44 have bent beyond self-locking, meaning at an angle of normally less than 173°, the subsequent bending is performed automatically without the armature 66 having to drive, by the mere force of the helical spring 35. The two members 42, 44 are brought to a position that may be described as V-shaped, see FIG. 10. During the movement from FIG. 1 to FIG. 2, the armature 66 may either release the knee lever hinge 70 as shown in the FIGS. 9 and 10 or the armature 66 may remain on the knee lever hinge 70 and leave the coil of the electromagnet 60.

It becomes apparent that in all the exemplary embodiments the locking unit may be brought back to working order so that it may be used repeatedly. It may be re-activated as long as the headrest has not been mechanically damaged during an accident.

The invention claimed is:

1. A headrest of a motor vehicle seat with a first structural component comprising fastening means for fastening said headrest to a seat back of said motor vehicle seat, with a second structural component that is disposed so as to be movable with respect to said first structural component, that comprises a bolster and that is moved forward with respect to said first structural component in an event of a crash, and with a drive unit that is disposed between said first structural component and said second structural component, that comprises a locking unit which is locked in a normal case and that has a crash sensor connected to said locking unit which it controls, wherein the locking unit comprises a disengagement drive with an electromagnet or a piezoelectric drive, that the locking unit comprises one retainer member associated with said first structural component and one movable disengagement member associated with said second structural component, that the retainer member and the disengagement member are connected together via a hinge or via balls, and that the disengagement drive is allocated to the movable disengagement member and is capable of causing said disengagement member to move, wherein the disengagement member comprises a circumferential groove, that said groove mates with said balls, that in the normal case the balls engage said groove and that the retainer member comprises an inner contour that the balls fit against and that said inner contour comprises outwardly extending bight portions that are at least as deep as the depth at which the balls engage the groove and each ball being assigned one bight portion.

2. The headrest as set forth in claim 1, wherein the disengagement drive is motion-linked to said disengagement member and causes said disengagement member to move, more specifically to rotate, when excited.

3. The headrest as set forth in claim 1, wherein in the normal ease said disengagement drive is not contacting the disengagement member but is separated from said disengagement member by a gap with said disengagement drive coming into contact with said disengagement member.

4. The headrest as set forth in claim 1, wherein the retainer member and the disengagement member are lever arms that are hinge-linked together via a knee lever hinge.

5. The headrest as set forth in claim 1, wherein three balls are provided.

6. The headrest as set forth in claim 5, wherein the disengagement drive is motion-linked to said disengagement member and causes said disengagement member to move, more specifically to rotate, when excited.

7. The headrest as set forth in claim 5, wherein a torsion spring is associated with the disengagement member and that a nose against which the disengagement drive, more specifically an armature of the electromagnet, fits is provided on said disengagement.

8. The headrest as set forth in claim 7, wherein the disengagement drive is motion-linked to said disengagement member and causes said disengagement member to move, more specifically to rotate, when excited.

9. The headrest as set forth in claim 5, wherein the retainer member and the disengagement member contact each other through the balls only.

10. The headrest as set forth in claim 9, wherein the disengagement drive is motion-linked to said disengagement member and causes said disengagement member to move, more specifically to rotate, when excited.

11. The headrest as set forth in claim 9, wherein a torsion spring is associated with the disengagement member and that a nose against which the disengagement drive, more specifically an armature of the electromagnet, fits is provided on said disengagement member.

12. The headrest as set forth in claim 11, wherein the disengagement drive is motion-linked to said disengagement member and causes said disengagement member to move, more specifically to rotate, when excited.

13. The headrest as set forth in claim 1, wherein the retainer member and the disengagement member contact each other through the balls only.

14. The headrest as set forth in claim 13, wherein a torsion spring is associated with the disengagement member and that a nose against which the disengagement drive, more specifically an armature of the electromagnet, fits is provided on said disengagement member.

15. The headrest as set forth in claim 14, wherein the disengagement drive is motion-linked to said disengagement member and causes said disengagement member to move, more specifically to rotate, when excited.

16. The headrest as set forth in claim 13, wherein the disengagement drive is motion-linked to said disengagement member and causes said disengagement member to move, mote specifically to rotate, when excited.

17. The headrest as set forth in claim 1, wherein a torsion spring is associated with the disengagement member and that a nose against which the disengagement drive, more specifically an armature of the electromagnet, fits is provided on said disengagement member.

18. The headrest as set forth in claim 17, wherein the disengagement drive is motion-linked to said disengagement member and causes said disengagement member to move, more specifically to rotate, when excited.

* * * * *

UNITED STATES PATENT AND TRADEMARK OFFICE
CERTIFICATE OF CORRECTION

PATENT NO. : 7,293,829 B2
APPLICATION NO. : 11/324912
DATED : January 4, 2006
INVENTOR(S) : Thomas Thiel et al.

It is certified that error appears in the above-identified patent and that said Letters Patent is hereby corrected as shown below:

Title Page, item [73] Assignee insert --C. Rob. Hammerstein GmbH & Co. KG, Solingen, Germany--

Signed and Sealed this

Twenty-fourth Day of November, 2009

David J. Kappos
*Director of the United States Patent and Trademark Office*